United States Patent [19]

Dear

[11] 4,142,673
[45] Mar. 6, 1979

[54] DOCUMENT HOLE MASK CIRCUITRY

[75] Inventor: Frederick H. Dear, Rochester, N.Y.

[73] Assignee: Burroughs Corporation, Detroit, Mich.

[21] Appl. No.: 844,477

[22] Filed: Oct. 21, 1977

[51] Int. Cl.$^2$ .......................... G06K 7/14; G06F 15/30
[52] U.S. Cl. .................... 235/458; 235/476; 235/379
[58] Field of Search ............... 235/458, 463, 475, 476, 235/379, 433, 437, 494, 487, 454, 375; 101/93 C; 340/146.3 C, 146.3 D, 146.3 Z; 250/566, 568, 569; 35/48 B

[56] References Cited

U.S. PATENT DOCUMENTS

| | | | |
|---|---|---|---|
| 3,609,305 | 9/1971 | Davis | 235/475 |
| 3,743,839 | 7/1973 | Leis | 235/476 |
| 3,745,312 | 7/1973 | Ladine | 235/475 |
| 3,949,363 | 4/1976 | Holm | 235/437 |
| 4,027,142 | 5/1977 | Paup | 235/475 |

*Primary Examiner*—Robert M. Kilgore
*Attorney, Agent, or Firm*—Robert J. Gaybrick; James E. Ledbetter; Edward J. Feeney, Jr.

[57] ABSTRACT

In a high speed document printing system a hole mask circuit is provided to compensate for erroneous indications of the entry of additional documents into the system due to the sensing of a discontinuity or aperture within the body of a valid document. The hole mask circuit receives a document present signal from an associated sensor and employs a retriggerable timing means to inhibit the recognition of an additional document unless the sensor has previously signaled the continuous absence of a document for a preselected time interval. The circuit is capable of discriminating between a valid document having apertures of a preselected maximum size, documents having invalidly sized apertures and spacings between successive documents.

10 Claims, 5 Drawing Figures

DOCUMENT HOLE MASK CIRCUITRY

FIELD OF THE INVENTION

The invention relates with particularity to a circuit for use within a document printing system to discriminate between a document having valid apertures, the spacing between successive documents and the existence of an unacceptable discontinuity in a document.

BACKGROUND OF THE INVENTION

The disclosed apparatus relates to Ser. No. 844,476 filed on even date herewith and entitled A Modular High Speed Printing System as well as Ser. No. 844,475 also filed on even date and entitled Method and Apparatus For Monitoring the Passage of Articles Through A Modular Processing System. The referenced applications are commonly assigned and the subject matter of each of them is hereby incorporated by reference.

The patent application entitled A Modular High Speed Printing System sets forth a modular document printing system which comprises a document feeder module coupled to one or more document printing modules and a document receiver module. The document printing modules include printheads which can print sequential numeric information, constant numeric information and alphanumeric information on documents which are conveyed through the system. The printing system disclosed therein also includes a plurality of document sensors for sensing the feeding of documents into the processing system as well as the entry and exit of documents from each printing module. The modular high speed printing system can be employed to print bank documents such as checks and deposit slips while also having many other applications in the high speed printing of documents. It can be appreciated that the formats of these documents can vary widely and that a modular printing system must possess a high degree of flexibility in order to be effectively and advantageously employed. It has been found that in a large number of applications it is necessary for the documents to include one or more apertures primarily along one edge to permit, for example, the insertion of the documents into ring binders for storage. Also, many times documents are bound within a pad but will include apertures for sorting or other purposes.

The prior art printing systems for preparing such documents primarily employ optical transducers for sensing the presence or absence of a document. A problem arises when the optical transducer recognizes the leading boundary of an aperture within a document as the end of the document and the trailing boundary of the same aperture as the leading edge of a second document. Many of the prior art devices were found to be unsuitable for printing on such documents because they could not accommodate the presence of apertures in the documents.

The instant apparatus can be incorporated into each of the printing or processing modules wherever there is an optical type sensor to inhibit the indication of a discontinuity in a document merely because that document includes one or more apertures. While having the ability to accommodate apertures of a specified maximum size anywhere within the document, the hole mask circuit also recognizes the presence of damaged or invalid documents while being able to accommodate the spacing between successive documents.

SUMMARY OF THE INVENTION

It is an object of this invention to provide a hole mask circuit for use in a document printing system which permits printing upon documents with apertures therein.

It is another object of this invention to provide a hole mask circuit within a document printing circuit which accommodates the normal spacings between successively presented documents.

A further object of this invention is to provide a hole mask circuit for use in a modular printing system to permit the printing upon variously formatted documents.

It is still another object of this invention to provide a hole mask circuit for use in a document printing system which is capable of distinguishing between valid and invalid apertures in documents.

These and other objects are accomplished by a hole mask circuit for use within a modular high speed printing system to enable the printing system to print upon documents which have valid apertures therein. The hole mask circuit is provided within each output line of the document sensors employed within the processing modules. The hole mask circuit monitors the output of the document sensors to prevent the presence of a valid aperture in a document from being interpreted erroneously as the end of one document and the beginning of another. The circuit includes a retriggerable one-shot with a preselected time-out period. One input to the one-shot is the output signal of a document sensor and the other input is a free running oscillator with a preselected frequency. The free running oscillator continuously retriggers the one-shot whenever a document signal is provided from the sensor and the time-out period of the one-shot is sufficient to maintain the output of the one-shot high even though there is a momentary interruption of the valid aperture in a document. If, however, a document signal is interrupted for a period longer than the time constant of the one-shot the circuit determines that either a new document has been encountered or that an invalid aperture has been sensed in the document.

BRIEF DESCRIPTION OF THE DRAWINGS

The novel features which are characteristic of this invention are set forth with specificity in the appended claims. The invention itself, however, both in its organization and method of operation together with further objects and advantages thereof may best be understood with reference to the following description when taken in conjunction with the accompanying drawings.

DESCRIPTION OF THE PREFERRED EMBODIMENT

Figure 1:
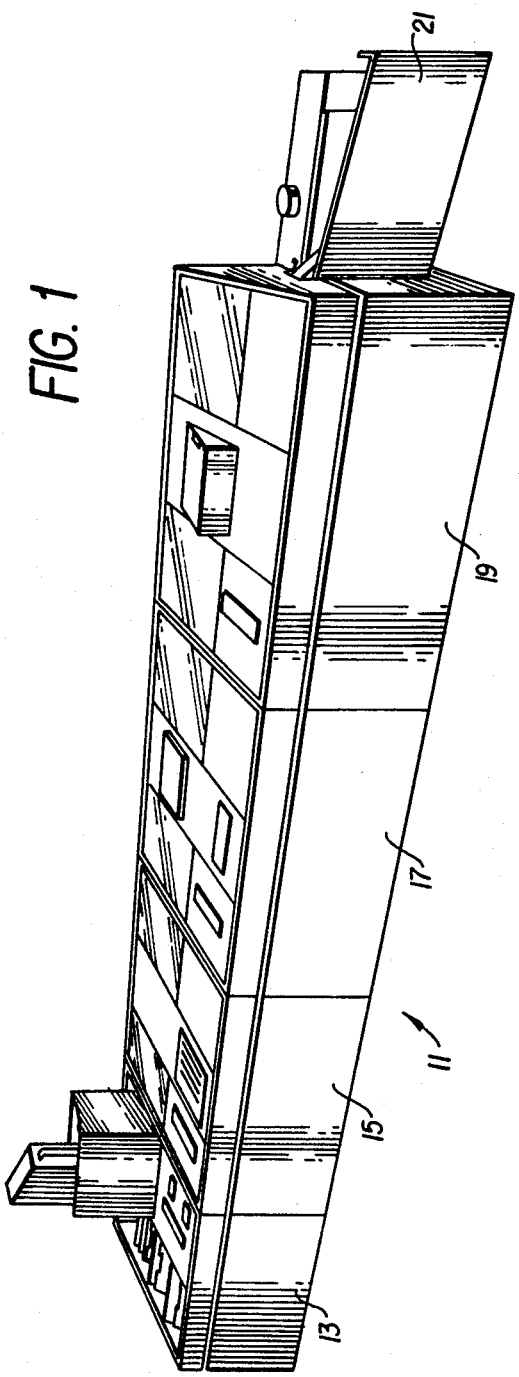
FIG. 1 is a perspective view of the module printing system wherein the instant hole mask circuit is employed.

FIG. 1 shows a perspective view of a modular document printing system which can advantageously employ the apparatus of the instant invention. The printing system 11 is shown to comprise a feeder module 13, printing modules 15, 17 and 19 and receiver module 21 which are coupled together to form an integrated high speed modular document printing system. Each of the printing modules 15, 17 and 19, as will hereinafter be explained, can employ a document hole mask circuit for the different document sensors within each printing module. A more detailed description of the modular document printing system can be found in the previously referenced application entitled A Modular High Speed Document Printing System.

Figure 2:
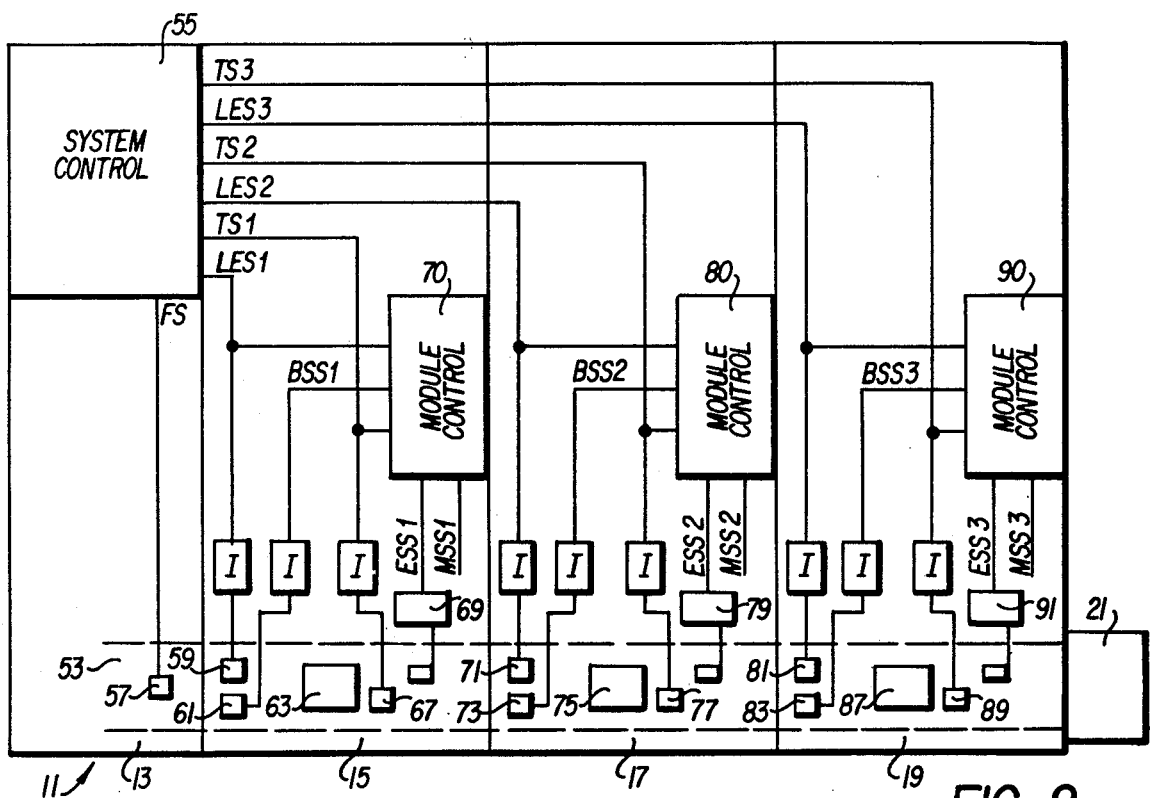
FIG. 2 shows a schematic embodiment of the modular document printing system within which the instant hole mask circuit is employed.

FIG. 2 shows a schematic of the modular document printing system of FIG. 1 which includes the document feeder module 13, printing modules 15, 17, 19 and the receiver module 21. The dashed portion shows the document path 53 from the feeder module through each of the printing modules to the document receiver module. Within the feeder module 13 is the system control 55 for controlling processing of documents by the printing system. Also within the feeder module is a feed sensor 57 coupled to the system control 55. The feed sensor could, for example, be a solid state detector which includes in a single housing a phototransistor and a light emitting diode. The diode and phototransistor are provided on the same side of the document path and are angularly related so that light from the diode would be reflected to the phototransistor when an article or document in the document path 53 passes the sensor 57. The reflection of light to the phototransistor on the surface of the article results in a feed sensor pulse FS being propagated from feed sensor 57 to system control 55. The feed sensor 57 could, however, be any type of sensor including a magnetic sensor depending upon the type of article or document which is being printed by the system.

A document progressing from the feeder module 13 to the first printing module 15 passes lead edge sensor 59 and skip or black-spot sensor 61. The lead edge sensor and the skip sensor are most advantageously of the optical type described for the feed sensor 57. It is felt that one skilled in the art would be able to provide such a sensor which generates an output pulse whenever a document is passing beneath the sensor and does not provide an output pulse when no document is in the path of the sensor. Thus it can be seen that if one or more apertures are present in a document in the path of the lead edge sensor 59 the output of the sensor will be low for the time it takes the aperture to pass completely past the sensor. The lead edge sensor 59 generates a lead edge sensor pulse which is supplied to the system control 53 as well as to the module control 70 of the first printing module 15. The document hole mask circuit I receives the signal from the sensor 59 and processes it in a manner which will hereinafter be described before providing it to the system control 53 and the module control 70. After the document passes the lead edge sensor 59 it encounters the document platen 63, trip sensors 67 and the end stop 69. The end stop 69 is selectively employed to arrest the movement of the document through the printing module 15 and position the document in a preselected manner on the surface of the platen 63. The trip sensor 67 is similar to the lead edge sensor 59 in that it is an optical sensor and produces a high output when a document is passing beneath the sensor and a low output when there is no document or there is an aperture in the document beneath the trip sensor.

Printing module 17 receives a document from the printing module 15 and includes in the document path 53 another lead edge sensor 71 employed with document hole mask circuit I. The lead edge sensor 71 and hole mask circuit I cooperate to generate a pulse LES2 which is supplied to both the system control 75 and the module control 80 of the printing module 17 whenever a document is passing beneath the sensor 71. The printing module 17 further includes black spot sensor 73, document printing platen 75, trip sensor 77, circuit 78 and end stop 79. These elements function in the same manner as their complements in printing module 15. Printing module 19 receives documents from the printing module 17 and as are found in the printing modules 15 and 17 the module 19 includes a lead edge sensor 81, document hole mask circuit I, black spot sensor 83, platen 87, trip sensor 89, document hole mask circuit 91 and end stop 92. More details on the functioning of the document printing platen, end stop and lead edge sensors and trip sensors can be found in the incorporated copending patent applications.

Figure 3:
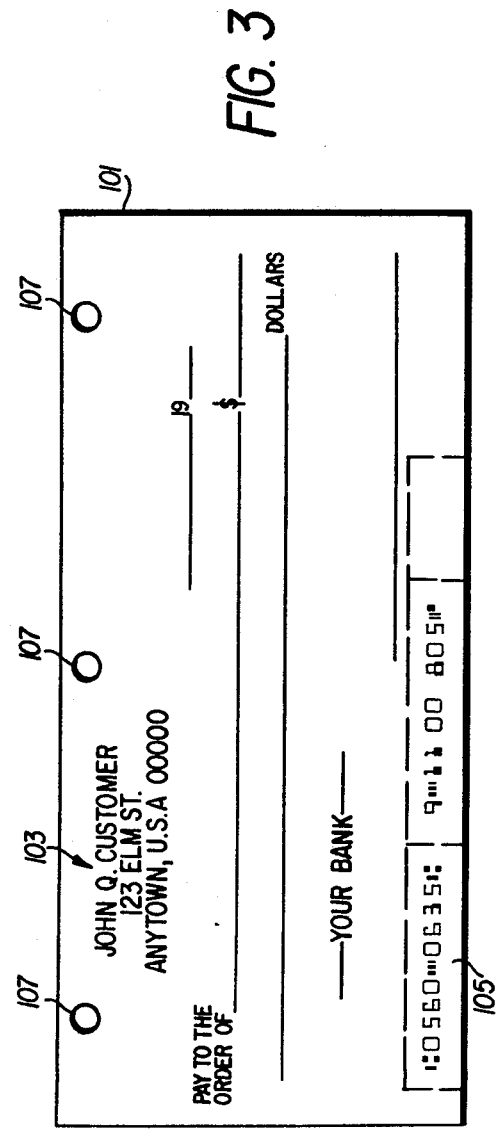
FIG. 3 shows an example of a document which has valid apertures therein.

FIG. 3 exemplifies a type of document which could be printed by the modular high speed printing apparatus within which the instant hole mask circuit is employed. The document in FIG. 3 will be recognized to be a conventional bank check 101 having a customer identification field 103, account field 105 and a series of apertures 107 which in this case are located along the top edge of the document. Assuming that a document such as 101 is presented to the first lead edge sensor 59 within document path 53 in such a manner that the apertures are within the scan area of the lead edge sensor 59 it can be seen that the signal from the lead edge sensor will contain at least three interruptions, or low values, within the scan of the document 101. The hole mask circuit of the instant invention is capable of masking out these interruptions such that the lead edge sensor will produce a continuous output pulse for a complete scan of the document from its right hand edge to its left hand edge.

Figure 4:
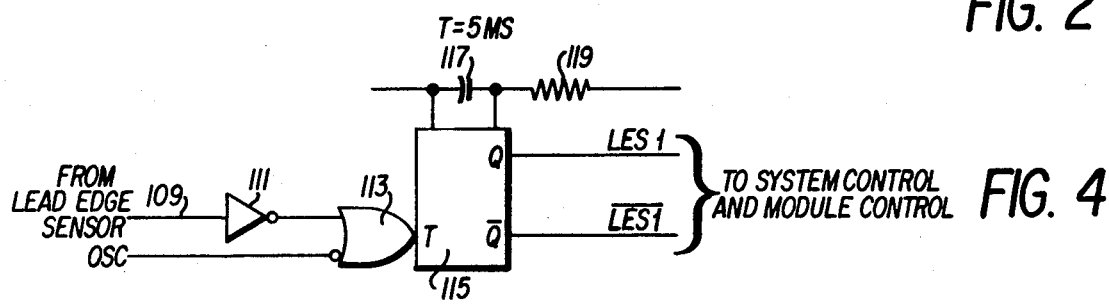
FIG. 4 exhibits an organization of logical devices which comprise an embodiment of the instant invention.

FIG. 4 shows an embodiment of the instant hole mask circuit which provides a simple and economical apparatus for masking out the presence of valid apertures in a document. The apparatus includes a lead 109 receiving the outputs from a document sensor and providing them through inverter 111 to OR gate 113. The other input to OR gate 113 is the inverted output from a free running oscillator which for example, could be running at the rate of 10 KHz. The OR gate 113 functions as the trigger to one-shot 115. The one-shot 115 has a selectable time constant which is controllable by the values of capacitor 117 and resistor 119. In the example shown the values of the capacitor 117, resistor 119 have been selected such that the one-shot will time out after five milliseconds (MS) and if the documents are being conveyed past the sensors at the speed of 100 inches per second, 5 MS will correspond to one-half inch of document movement and, therefore, a one-half inch aperture could pass by a document sensor without resulting in one-shot 115 timing out. The Q output of one-shot 115 is LES1 and corresponds to a high value representing the presence of a document beneath the associated document sensor. The $\overline{Q}$ output is $\overline{LES1}$ and is a low value indicating that no document is currently within the associated document sensor. The LES1 and LES1 signals are provided as previously shown to the system control and the module controls.

In operation of the device, the one-shot 115 will time out whenever the input on the trigger T is continuously high for the time constant of the one-shot. In the embodiment which has been described a pulse from a document lead edge sensor will go high when the light from the light emitting diode is reflected off the document and received by the phototransistor. This high value is inverted by inverter 111 to present a low to OR gate 113 whenever a document is present within the associated document sensor. Normally, the one-shot 115 will be retriggered every time the value of the oscillator goes high and will maintain Q at a high output by continuously retriggering the one-shot before it times out. If, however, no document is present within the lead edge sensor the signal over lead 109 will be low and will be inverted by 111 to present the high or true value to OR gate 113 for that period equal in duration to the period wherein no document is sensed by the lead edge sensor. If OR gate 115 is held in a constant true state the one-shot will be inhibited from being retriggered by the oscillator and after 5 milliseconds will time out to thus generate a low output on Q. It can be seen that if the output from the sensor over lead 109 is low because of the presence of an aperture in the document then the duration of the low value over lead 109 controls whether the one-shot 115 will time out.

Figure 5:
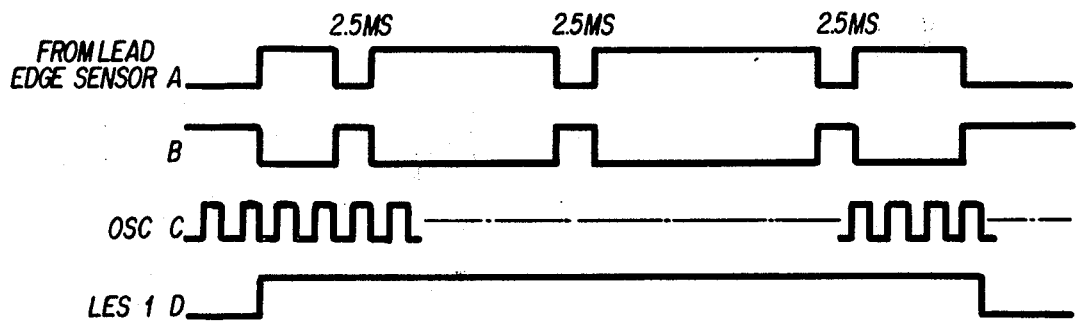
FIG. 5 is a timing diagram to be read in conjunction with FIG. 4.

The operation of the instant whole mask circuit may best be understood when the timing diagram of FIG. 5 is considered in conjunction with the sample document of 101 and its effect on the embodiment shown in FIG. 4. The document 101 is shown to include three apertures 107. As has been previously explained whenever there is no document present within a lead edge sensor or when an aperture is present within a lead edge sensor the output from the lead edge sensor will be low and, conversely, whenever a document is present within the sensor the output from the lead edge sensor will be high. In FIG. 5 the output from the lead edge sensor for the document shown in FIG. 1 is graphically illustrated as waveform A. The output from the document sensor goes high concurrently with the presence of the document in the sensor. Upon reaching the aperture 107 the output goes low for the period that it takes the aperture to pass the sensor. In the illustrated case assuming the aperture is ¼ inch and the document is moving at 100 inches per second the output from the lead edge sensor will go low for 2.5 MS. After encountering the first aperture 107 the signal from the lead edge sensor goes back high until the second and then the third apertures 107 are encountered. Waveform C exemplifies the output of the oscillator supplied as an input to OR gate 113 and waveform B shows the inverted output from the lead edge sensor. Waveform D shows that in the illustrated example the inverted output from the lead edge sensor is never continuously high for the time-out constant of the one-shot 115 and thus the oscillating input will continuously retrigger the one-shot such that a continuously high output is provided over LES1. Since the period of the one-shot is 5 MS the output from LES1 will be high for 5 MS longer than will be the output from the lead edge sensor. It should be understood that while the above description sets forth the use of a hole mask circuit in conjunction with a document lead edge sensor that it is intended that the hole mask circuit be employed whenever the presence of valid apertures is not to effect the output of the sensor.

To summarize the operation of the disclosed hole mask circuit in general terms it can be seen that the apparatus receives an output from a document sensor and by incorporating a retriggerable device the circuit masks out any change in the value of the signal from the document sensor which is of a duration less than the time constant of the retriggerable device. Thus, by selecting the appropriate time constant of the retriggerable device it is possible to process documents which contain valid apertures. The inclusion of this hole mask circuit within the previously mentioned modular high speed document processing system greatly adds to the flexibility of the system by inhibiting the erroneous generation of signals by the document sensors indicating that a document is not present therein.

The foregoing description of a document hole mask circuit is intended to be explanatory of an apparatus for accommodating valid apertures in documents processed by a modular document processing system. It will be understood from the foregoing that various changes may be made in the preferred embodiment as illustrated herein and it is intended that the foregoing material be taken as illustrative only and not in a limiting sense. The scope of the invention is defined by the following claims.

What is claimed is:

1. An apparatus for inhibiting a discontinuity in an output signal due to an interruption in said output signal, said apparatus comprising:
   means for generating said output signal; and
   means receiving said output signal for maintaining said output signal if the duration of said interruption is less than or equal to a preselected time interval and for inhibiting said output signal if the duration of said interruption is greater than said preselected time interval.

2. The apparatus of claim 1 wherein said means receiving said output signal comprises:
   retriggerable timing means for generating, when triggered, an output signal of a predetermined value for a predetermined time interval; and
   means for triggering said retriggerable timing means.

3. The apparatus of claim 2 wherein said means for triggering said retriggerable timing means comprises:
   an oscillator means for generating a series of oscillator pulses; and
   a two input OR gate, one of said inputs receiving said output signal from said means for generating said output signal and the other of said inputs receiving said oscillator signals whereby said retriggerable timing means is retriggered either by said output signal or by said oscillator pulses.

4. The apparatus of claim 3 wherein said retriggerable timing means inhibits the generation of said output signal when said retriggerable timing means has been continuously triggered by said triggering means for an interval exceeding said predetermined time interval.

5. In a modular document printing system, a circuit for inhibiting the interruption of an output signal from a document sensor upon the sensing of an aperture in a document by said document sensor, said circuit comprising:
   retriggerable timing means for generating an output signal of a preselected value for a preselected duration when said retriggerable timing means is triggered and for inhibiting the generation of said output signal when said retriggerable timing means is continuously triggered for a period exceeding said predetermined time interval;

oscillator means for generating a series of oscillator pulses; and trigger means receiving said document sensor output signal and said oscillator pulses for retriggering said retriggerable timing means upon the reception of said output signal and said oscillator pulses.

6. The circuit of claim 5 wherein said retriggerable timing means is a one-shot.

7. The circuit of claim 6 wherein said one-shot generates a high output of said preselected duration when triggered and a low output when continuously triggered for longer than said preselected duration.

8. The circuit of claim 6 wherein said trigger means comprises an OR gate.

9. An aperture masking circuit for use in cooperation with an optical document sensor to inhibit valid apertures of a specified maximum size in the documents from interrupting the high document signals from said sensor, the circuit comprising:

a retriggerable one-shot for generating a high output signal of a constant duration equal to the time it takes for a valid aperture to pass a document sensor whenever said one-shot is triggered, said one-shot generating a low output signal when continuously triggered for longer than said constant duration;

oscillator means for producing a series of oscillator pulses; and trigger means receiving said oscillator pulses and said document signal for triggering said one-shot whereby said one-shot generates a high output signal when triggered by said oscillator pulses or by a document signal shorter than said constant duration and a low output signal when triggered by a document signal longer than said constant duration.

10. A method of inhibiting the interruption of a document signal from a document sensor when said sensor scans validly sized apertures in a document, said method comprising the steps of:

generating a high output signal by said sensor when said sensor scans a document and a low output signal when said sensor scans an aperture in said document;

inverting said generated signals;

generating a series of oscillator pulses;

triggering a retriggerable one-shot with said inverted signals and said oscillator pulses whereby said one-shot maintains said document signal when triggered by an oscillator pulse or an inverted signal less than or equal in duration to the time required for a validly sized aperture to pass said sensor and said one-shot inhibits said document signal when continuously triggered by an oscillator pulse or inverted signal greater in duration than the time required for a validly sized aperture to pass said sensor.

* * * * *